Figure 1:
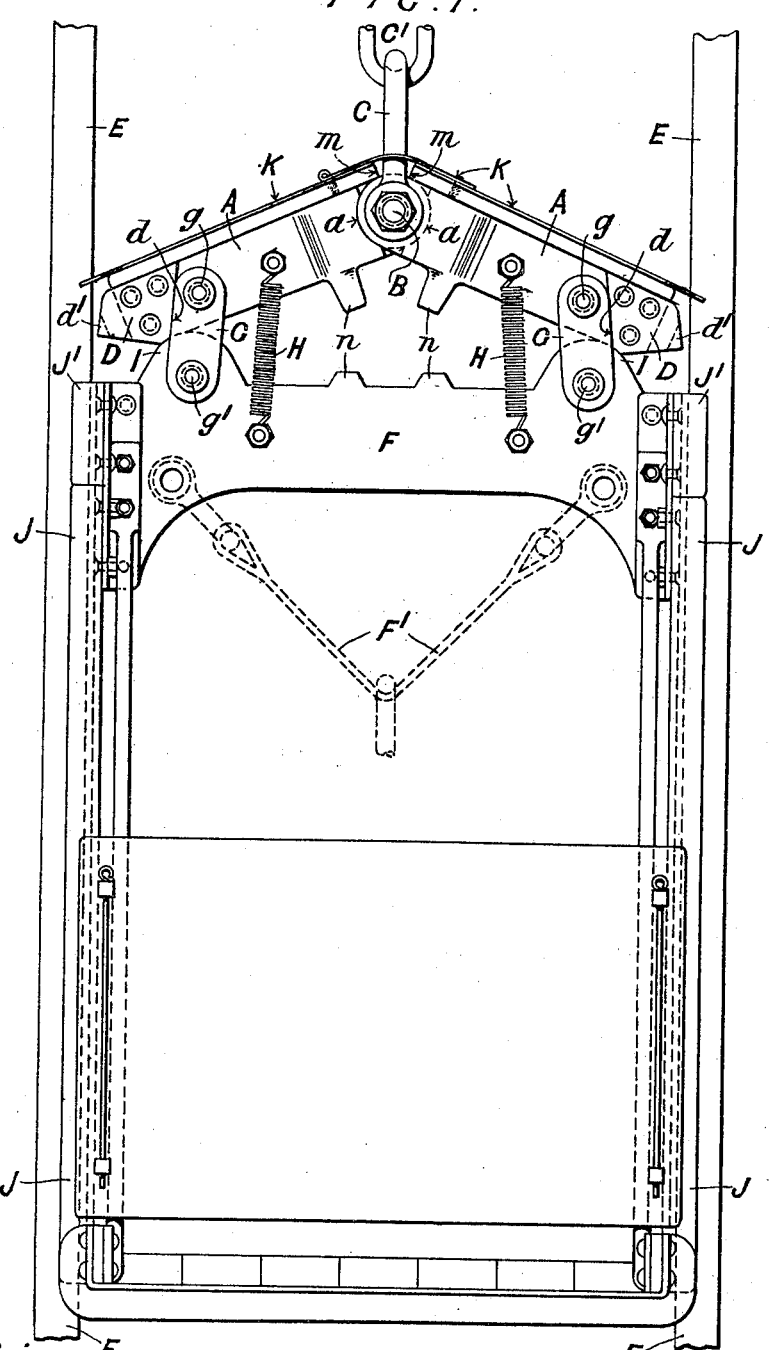

No. 707,410. Patented Aug. 19, 1902.
R. HAINSWORTH.
SAFETY SUSPENDING APPARATUS FOR ELEVATORS OR THE LIKE.
(Application filed Apr. 29, 1902.)
(No Model.) 2 Sheets—Sheet 1.

WITNESSES:
W. M. Avery
W. Harrison

INVENTOR
Robinson Hainsworth
BY
ATTORNEYS.

No. 707,410. Patented Aug. 19, 1902.
R. HAINSWORTH.
SAFETY SUSPENDING APPARATUS FOR ELEVATORS OR THE LIKE.
(Application filed Apr. 29, 1902.)
(No Model.) 2 Sheets—Sheet 2.
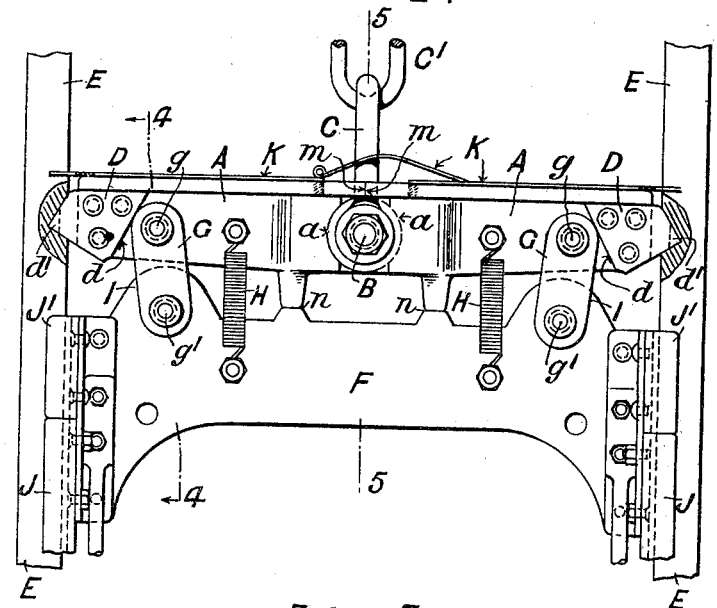
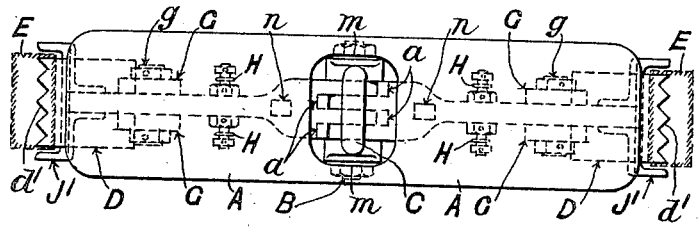
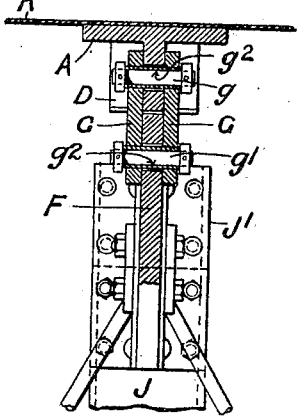 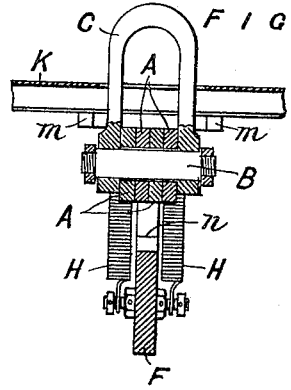
INVENTOR
Robinson Hainsworth

UNITED STATES PATENT OFFICE.

ROBINSON HAINSWORTH, OF HULL, ENGLAND.

SAFETY SUSPENDING APPARATUS FOR ELEVATORS OR THE LIKE.

SPECIFICATION forming part of Letters Patent No. 707,410, dated August 19, 1902.

Application filed April 29, 1902. Serial No. 105,244. (No model.)

*To all whom it may concern:*

Be it known that I, ROBINSON HAINSWORTH, engineer, a subject of the King of Great Britain, residing at 21 Victoria street, Hull, England, have invented new and useful Improvements in Safety Suspending Apparatus for Elevators or the Like, of which the following is a specification.

My invention relates to improved safety-catch gear for mine and lift cages, skips, and the like, whereby to more effectually prevent the cage falling in the event of breakage of the hoisting-rope, the safety-gear being so designed that immediately the tension of the rope ceases to retain the said gear out of action the safety-catches will be caused to bind against the guides with so powerful a grip as to prevent any appreciable fall of the cage, which will be securely supported at whatever height it may happen to be when the breakage occurs.

Reference is to be had to the accompanying drawings, wherein—

Figure 1 is a front elevation showing the safety apparatus in the normal inoperative position. Fig. 2 is a similar view of the upper part of the cage, showing the safety apparatus in action. Fig. 3 is a plan view of the safety apparatus. Figs. 4 and 5 are detail sections on lines 4 4 and 5 5, Fig. 2, respectively.

The hoisting-rope is connected to the cage through the medium of a pair of toggle-levers A A, formed of bars preferably of T-section, whose inner ends are jointed together upon a common joint-pin B, to the ends of which the shackle-link C for the attachment of the hoisting-rope C' is connected. The outer ends of the toggle-levers terminate in dogs or shoes D, serrated so as to be adapted to embed in and jam against the faces of the cage-guides E when the toggle-levers are permitted to come into action, such dogs being, however, normally held out of contact with the guides by the tension of the hoisting-rope. These toggle-levers are fulcrumed on the top cross-beam F of the cage-frame by a pair of radius-links G, through the medium of which the weight of the cage is transmitted to the toggle-bars and the rope. A spring or springs H would be applied to act upon the toggle-levers A so as to tend to bring the toggles and their dogs into operative position, the power of the springs being normally overcome by the tension on the hoisting-rope consequent on the weight of the cage. In this position the toggle-levers A A are caused to assume an angular position relatively to each other in the form of a wide or obtuse-angled inverted V, as shown in Fig. 1, the upward motion of their inner ends being limited by their outer arms beyond the fulcrum-links G G coming in their downward and retractile movement against abutments I upon the top cross-beam F of the cage-frame, this action being assisted by the inner or rear faces $d$ of the dogs D being of such form as to engage the outer edges of the fulcrum-links G.

The cage-frame is provided with guide runners or shoes J, which embrace and travel upon the guides E. These runners extend the whole height of the cage-frame in two sections, their upper sections J' being permanently fixed to the ends of the top cross-beam F, the lower sections, together with the body part of the cage, being capable of disconnection, so as to leave only the top cross-beam F and the attached sections J' of the runners connected to the safety apparatus and hoisting-rope. When it is required to lower down the mine-shaft parts of heavy machinery or other articles not adapted for conveyance in the cage, such articles would be slung from the cross-beam F instead of directly from the rope, as is usual when the cage is wholly disconnected therefrom, the connections of the sling with the cross-beam being equidistant from and near to the ends of the cross-beam, as indicated in dotted lines at F', Fig. 1.

In order to prevent the various pivotal joints of the apparatus from binding and so avoid one cause of failure of the safety-gear to act in the event of the rope breaking, the center pin B and the joint-pins $g$ $g'$ of the links G have upon them steel sleeves which fit loosely in the holes, but tightly on the pins, the length of the sleeve in each case slightly exceeding the conjoined thickness of the members to be connected, as shown at $g^2$ in Fig. 4, or the pins B $g$ $g'$ are made of increased diameter where they pass through the members which they connect, each pin having shoulders at a distance apart slightly greater than the conjoined thickness of those members as shown in Fig. 5. By these means the clearance necessary for freedom of working of the moving parts is insured.

The inner ends of the toggle-levers A, which are jointed together on the pin B, are in the form of overlapping or intersecting tenons, the rounded ends $a$ of which are preferably fitted to bear (with a minimum amount of friction) each against correspondingly-concaved abutments on the other lever, so that the sudden stress consequent on the toggles coming into action will be borne mainly by the ends of the levers and their abutments and will not come wholly on the joint-pin B, as would otherwise be the case.

The fulcrum-links G, which connect the toggle-levers A to the cross-beam F, are preferably made each of a pair of members acting as one and jointed to the levers A and the cross-beam F by joint-pins $g\ g'$, respectively, these pins being sleeved or shouldered, as above described.

To protect the occupants of the cage from wet and from objects falling down the shaft, a removable roof is provided formed of two overlapping sections K, hinged or otherwise fixed upon the toggle-levers A, so as while partaking of any movement of the toggles to avoid interfering with the play of the latter.

The dogs D may be made in one with the toggle-levers A, but are preferably formed of steel blocks bolted to the levers, the outer ends of the dogs being beveled to a V form, so as to present a comparatively narrow acting face and combine great strength of resistance to end thrust with the necessary penetrative power, the serrated acting faces $d'$ being formed with series of acute pyramidal teeth adapted to be caused under the outward thrust of the toggles to penetrate the faces of the wooden guides E, upon which the cage-runners J work.

When in consequence of the hoisting-rope breaking the springs H are free to act, the toggle-levers A under the stress of the springs H tend to depart from their relative angular position shown in Fig. 1 and to straighten out in line with each other, as shown in Fig. 2, which movement has the effect of moving the dogs D outward and of forcing their serrated acting portions $d'$ into contact with the guides E with such pressure as to cause the serrations to penetrate the guides. As soon as such contact of the dogs with the guides occurs the descent of the dogs D along the guides is thereby checked, and the weight of the cage acting on the toggles A through the medium of the fulcrum-links G at once reinforces the action of the springs H, the force tending to straighten the toggles being thereby so augmented as to cause the dogs D to press still more forcibly against the guides until their teeth $d'$ become completely embedded therein. Should the breakage of the rope occur while the cage is ascending, the result will be that all downward motion of the cage will be at once arrested, while in the event of the rope breaking during the descent of the cage at a high speed the teeth $d'$ of the dogs will bite into and rip the faces of the guides E, and the cage, notwithstanding the powerful gripping action of the toggles, will thus be brought to rest gradually and without the sudden shock which would otherwise be caused by the too-sudden arrest of the cage. It is to be observed that the position of greatest grip is reached when the axis of the pin B descends to the level of the horizontal line drawn through the fulcrum-pins $g$ of the toggle-levers A, beyond which position the pin B is prevented from passing by shoulders $m$ on the upper side of the levers A butting together in the manner of a knee-joint. Stops, such as $n$, may also be provided on the cross-beam F and levers A to coact with the shoulders $m$ in preventing the pin B from descending below the common horizontal line of centers of the levers and so to relieve the pin B of cross strain.

I claim—

A safety apparatus for mine and lift cages, skips and the like, consisting of a pair of toggle-levers in angular relation to each other, united by a common pivotal joint connected to the hoisting-rope, and terminating at their outer ends in dogs of V form with narrow pyramidally-toothed acting faces in immediate proximity to the faces of the cage-guides, in combination with a cross-beam, pairs of connecting-links pivoted to the toggle-levers and to the cross-beam, springs connected to the cross-beam and applied to act on the toggle-levers in opposition to the pull of the hoisting-rope, so as to tend to straighten the toggle-levers and cause their acting faces to be thrust into forcible contact with the cage-guides, abutments on the cross-beam and stops on the levers coacting with the connecting-links to limit the normal angular relation of the toggle-levers under the pull of the rope, and a stop to prevent the descent of the common pivotal axis of the toggle-levers below the common line of centers of those levers, substantially as herein described.

ROBINSON HAINSWORTH.

Witnesses:
  T. W. KENNARD,
  M. R. SPIER.